United States Patent
Inamura et al.

(10) Patent No.: US 7,577,851 B2
(45) Date of Patent: Aug. 18, 2009

(54) MULTITASK EXECUTION APPARATUS AND MULTITASK EXECUTION METHOD

(75) Inventors: Yu Inamura, Kawasaki (JP); Toru Egashira, Yokohama (JP); Atsushi Takeshita, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 805 days.

(21) Appl. No.: 11/171,290

(22) Filed: Jul. 1, 2005

(65) Prior Publication Data

US 2006/0020941 A1 Jan. 26, 2006

(30) Foreign Application Priority Data

Jul. 2, 2004 (JP) .............................. 2004-197157

(51) Int. Cl.
*G06F 11/30* (2006.01)
(52) U.S. Cl. ....................... 713/189; 713/190; 713/193; 380/44; 380/264; 711/102; 718/100; 718/107
(58) Field of Classification Search ................. 713/189, 713/190, 193; 380/44, 264; 711/102; 718/100, 718/107
See application file for complete search history.

(56) References Cited

U.S. PATENT DOCUMENTS

| | | | |
|---|---|---|---|
| 5,224,166 A | | 6/1993 | Hartman, Jr. |
| 5,940,508 A * | | 8/1999 | Long et al. .................. 380/273 |
| 6,345,359 B1 * | | 2/2002 | Bianco ........................ 713/190 |
| 6,398,245 B1 * | | 6/2002 | Gruse et al. ................. 280/228 |
| 6,405,317 B1 * | | 6/2002 | Flenley et al. ................... 726/4 |
| 6,665,755 B2 * | | 12/2003 | Modelski et al. ............ 710/100 |
| 6,889,378 B2 * | | 5/2005 | Sueyoshi ..................... 719/310 |
| 6,934,780 B2 * | | 8/2005 | Modelski et al. ............ 710/100 |
| 6,966,002 B1 * | | 11/2005 | Torrubia-Saez .............. 726/29 |
| 6,978,375 B1 * | | 12/2005 | Nusser et al. ................ 713/187 |

(Continued)

FOREIGN PATENT DOCUMENTS

JP 2001-51819 2/2001

(Continued)

OTHER PUBLICATIONS

Jun Yang, et al., "Fast Secure Processor for Inhibiting Software Piracy and Tampering", Proceedings of the 36th International Symposium on Microarchitecture (MICRO-36'03), XP-010674237, Dec. 3, 2003, 5 pages.

(Continued)

*Primary Examiner*—David Garcia Cervetti
(74) *Attorney, Agent, or Firm*—Oblon, Spivak, McClelland, Maier & Neustadt, P.C.

(57) ABSTRACT

A multitask execution system executes a plurality of tasks in parallel. The multitask execution system includes an encryption processor configured to generate a key stream unique to each task, by using key data, a task ID for identifying each task, and an output value, the number of the key data being smaller than the number of the plurality of tasks, the output value being output from a monotonic incremental counter when each task is generated, a value of the monotonic incremental counter configured to continue to be increased without being decreased, and to encrypt data stored in a protected area in a memory space for each task by using the generated key stream.

10 Claims, 7 Drawing Sheets

U.S. PATENT DOCUMENTS

| | | | |
|---|---|---|---|
| 6,983,374 B2* | 1/2006 | Hashimoto et al. | 713/194 |
| 7,219,369 B2* | 5/2007 | Hashimoto et al. | 726/21 |
| 7,318,083 B2* | 1/2008 | Senda | 709/203 |
| 7,334,231 B2* | 2/2008 | Sueyoshi | 719/310 |
| 7,353,404 B2* | 4/2008 | Hashimoto et al. | 713/194 |
| 7,360,252 B1* | 4/2008 | Torrubia-Saez | 726/27 |
| 7,398,526 B2* | 7/2008 | Sueyoshi | 719/310 |
| 7,424,622 B2* | 9/2008 | Hashimoto et al. | 713/194 |
| 2002/0065866 A1* | 5/2002 | Sueyoshi | 709/102 |
| 2002/0116587 A1* | 8/2002 | Modelski et al. | 711/154 |
| 2002/0120798 A1* | 8/2002 | Modelski et al. | 710/107 |
| 2003/0055890 A1* | 3/2003 | Senda | 709/203 |
| 2003/0065933 A1* | 4/2003 | Hashimoto et al. | 713/194 |
| 2003/0182571 A1* | 9/2003 | Hashimoto et al. | 713/194 |
| 2004/0143748 A1* | 7/2004 | Yamaguchi et al. | 713/193 |
| 2005/0010921 A1* | 1/2005 | Sueyoshi | 718/100 |
| 2005/0076169 A1* | 4/2005 | Modelski et al. | 710/100 |
| 2005/0166045 A1* | 7/2005 | Sueyoshi | 713/164 |
| 2006/0070019 A1* | 3/2006 | Vishnumurty et al. | 717/101 |
| 2008/0276322 A1* | 11/2008 | Sueyoshi | 726/26 |

FOREIGN PATENT DOCUMENTS

| | | |
|---|---|---|
| JP | 2001-318787 | 11/2001 |
| JP | 2003-108442 | 4/2003 |
| JP | 2004-38394 | 2/2004 |

OTHER PUBLICATIONS

"SP 800-38A Recommendation for Block Cipher Modes of Operation—Methods and Technical", National Institute of Standards and Technology, Technology Administration U.S. Department of Commerce, Dec. 2001, 6 cover pages and pp. 1-59.

* cited by examiner

FIG.7

| KEY No. | KEY DATA | GENERATION DATE | CURRENT FLAG | NUMBER OF REFERENCES |
|---|---|---|---|---|
| 0 | 41083114a5d93b51c27f178d406a47bf | 2004/6/1 12:00:00 | no | 3 |
| 1 | 989d231e9d8ab31110bb103feac1a063 | 2004/6/1 13:00:00 | yes | 25 |
| 2 | de2840063c69314cb7fe777df05dfc0c | 2004/6/1 10:00:00 | no | 0 |
| 3 | 009becc97b7542dc44d33d4685566dff | 2004/6/1 11:00:00 | no | 0 |

FIG.8

| PROTECTED AREA No. | STARTING ADDRESS | SIZE | STATE INFORMATION | USED KEY DATA No. |
|---|---|---|---|---|
| 0 | 4000 | 80 | CRYPTOGRAM | 0 |
| 1 | 8000 | 400 | PLAINTEXT | 1 |
| 2 | fe803000 | 600 | PLAINTEXT | 1 |
| 3 | fec53400 | 800 | CRYPTOGRAM | 1 |

MULTITASK EXECUTION APPARATUS AND MULTITASK EXECUTION METHOD

CROSS REFERENCE TO RELATED APPLICATION

This application is based upon and claims the benefit of priority from the prior Japanese Patent Application No. P2004-197157, filed on Jul. 2, 2004; the entire contents of which are incorporated herein by reference.

BACKGROUND OF THE INVENTION

1. Field of the Invention

The present invention relates to a multitask execution system for executing a plurality of tasks in parallel.

2. Description of the Related Art

In recent years, in fact, every computer from a personal computer (PC) used by an individual to a server computer for providing a service of electronic commerce and the like, and further to a super computer has provided a multitask environment.

Here, the multitask environment is an environment enabling a plurality of "tasks" as processing units to be handled by the computer to be executed simultaneously.

It is expected that, in the near future, such a multitask environment will be realized also in a platform such as a cellular phone in which computing resources are limited.

In general, an operating system provides a function to prevent an interference between the tasks by allocating memory spaces (memory spaces for the respective tasks) independent of one another to the respective tasks by using a technology called virtual addressing.

However, like a case of debugging and so on of a program, there is a case where it is necessary for a certain task to access the memory space for the other task, and accordingly, the respective tasks are not necessarily independent of one another.

Therefore, it is common that important information such as data necessary to manage the tasks is placed not in the memory spaces for the respective tasks but in a memory space (memory space for the operating system) allocated by the operating system for itself.

However, in comparison with the memory spaces for the respective tasks, the memory space for the operating system lacks in flexibility, for example, has difficulty performing paging. The paging is a technology for making a memory space with a size larger than a capacity size of installed memories usable by temporarily saving data on the memory space into a secondary storage device such as a hard disk.

To place a large amount of information in such a memory area for the operating system, which has the property as described above, can possibly bring an adverse effect in performance.

The most u-and-coming technique at present as a method of safely placing the above-described important information in the memory spaces for the respective tasks in order to solve such a problem is to encrypt the important information, thereby preventing the important information concerned from being accessed by the other tasks.

As such a technique, for example, U.S. Pat. No. 5,224,166 (hereinafter, referred to as Patent Document 1) discloses a technology for storing data and a code in an encrypted format on external storage and memory, and decrypting such data and code when reading the data and code into a cache area placed in a physically safe area in a central processing unit (CPU), thereby eliminating unauthorized accesses from the other tasks.

In such a technology, a key for decrypting the encrypted data and code is also placed in the physically safe area, thereby eliminating the unauthorized accesses from the other tasks.

Moreover, in such a technology, decrypted plaintext data is placed only in the cache area located in the physically safe area, and when being written back to the memory by cache-write-back operation of the CPU, the plaintext data is automatically encrypted, and confidentiality thereof is thus ensured.

Moreover, as such a technique, Japanese Patent Laid Publication No. 2001-318787 (hereinafter, referred to as Patent Document 2) discloses a technology for performing decryption processing for the data on the memory when reading the data concerned into the cache, performing encryption processing for the data when writing the data into the cache, and in addition, encrypting also inherent information of the task, such as an execution register, when implementing a function of the operating system, which is called "context switching", thereby also preventing an attack using a debugger.

However, in the above-described conventional technologies, it is basically necessary to perform the encryption processing by using encryption keys different for each task, and accordingly, memory areas for holding keys the number of which is equal to the number of tasks operatable simultaneously are required.

Moreover, in the above-described conventional technologies, a symmetric key encryption algorithm executable at a high speed is used as an encryption algorithm.

In the case of using a "CBC (Cipher Block Chaining) mode" common as the symmetric key encryption algorithm, data called "IV (Initialization Vector)" is required.

However, as a result of a recent research in the cryptography, it is pointed out that unpredictability is required also for the data called "IV" (for example, refer to "SP 800-38A Recommendation for Block Cipher Modes of Operation— Methods and Technique", National Institute of Standards and Technology, US Department of Commerce, December 2001, which is referred to as Non-Patent Document 1). Accordingly, in order to safely utilize the encryption algorithm as described above, a much more memory area is required.

Although such a requirement for the memory is not problematic to a platform having a sufficient memory resource, such as the recent PC, server computer and super computer, the requirement can be a great problem in a platform having a limited memory resource, such as a PDA and the cellular phone.

In order to solve such a problem, Japanese Patent Laid Publication No. 2001-51819 (hereinafter, referred to as Patent Document 3) discloses a technology for performing encryption processing for context data by using a single key generated as random number data at a time of reset processing of a microprocessor, thereby protecting the context data concerned.

However, as in the technology disclosed in Patent Document 3, in a method of simply performing the encryption processing by using the single key as the means for protecting the important information in the individual tasks, defects to be described below are inherent, and the method has had a problem that it cannot be safe in a cc n multitask environment.

Specifically, in the case of protecting the important information on the tasks by the encryption processing using the singly key, as shown in FIGS. 1A and 1B, an attacker performs operations as below by using two tasks B and C, and thus can read important information of a task A as an object to be attacked.

First, the task B under execution stops execution of the task A and the task C by an interface provided by the operating system.

Second, the task B copies a protected area (already encrypted by the operating system at this point of time) storing the important information of the task A to a protected area (also already encrypted by the operating system at this point of time) of the task C (refer to FIG. 1A).

Third, the task B resumes the execution of the task C, and allows the task C itself to output important information stored in the protected area thereof (refer to FIG. 1B). Such operations are executed under the task C, and accordingly, the important information stored in the protected area is decrypted by the operating system. As a result, the important information of the task A will be outputted.

BRIEF SUMMARY OF THE INVENTION

The present invention has been made in view of the foregoing problems, and it is an object of the invention to provide a multitask execution system capable of protecting important information of each task efficiently by mans of a small memory resource in a modern operating system providing a multitask environment.

A first aspect of the present invention is summarized as a multitask execution system for executing a plurality of tasks in parallel. The multitask execution system includes: an encryption processor configured to generate a key stream unique to each task, by using key data, a task ID for identifying each task, and an output value, the number of the key data being smaller than the number of the plurality of tasks, the output value being output from a monotonic incremental counter when each task is generated, a value of the monotonic incremental counter configured to continue to be increased without being decreased, and to encrypt data stored in a protected area in a memory space for each task by using the generated key stream.

In the first aspect, the encryption processor can include: a key stream generating function configured to generate the key stream by encrypting a counter value including the task ID and the output value by means of a predetermined encryption mode using the key data; a blocking function configured to divide the data stored in the protected area into predetermined blocks; and an exclusive-OR calculation function configured to calculate an exclusive-OR between a bit string of the generated key stream and a bit string of a predetermined divided block, and to store the calculated exclusive-OR in the protected area.

In the first aspect, the multitask execution system can further include: a decryption processor configured to decrypt the data stored in the protected area by using the key stream, and the encryption processor can be configured to encrypt data stored in the protected area decrypted by the decryption processor by using the key stream generated by using the updated key data.

In the first aspect, the decryption processor can be configured to decrypt the data stored in the protected area by using a key stream generated by using the key data in which a valid period has elapsed, and the encryption processor can be configured to encrypt the data decrypted by the decryption processor and stored in the protected area by using the key stream generated by using another key data than the key data in which the valid period has elapsed.

In the first aspect, the output value outputted from the monotonic incremental counter can be a time value provided by the operating system, and an operation of returning the time value to the past can be configure to be prohibited in the operating system.

In the first aspect, the monotonic incremental counter can be provided as hardware.

BRIEF DESCRIPTION OF THE SEVERAL VIEWS OF THE DRAWINGS

FIG. 7 is a table showing an example of managed contents in a function of encryption/decryption processing of a multitask execution system according to a second embodiment of the present invention.

FIG. 8 is a table showing an example of managed contents in a function of task information storage of the multitask execution system according to the second embodiment of the present invention.

DETAILED DESCRIPTION OF THE INVENTION

Multitask Execution System According to First Embodiment of the Present Invention A multitask execution system according to a first embodiment of the present invention will be described with reference to FIG. 2 to FIG. 6.

The multitask execution system according to this embodiment is implemented in a modern operating system capable of executing a plurality of tasks in parallel.

The multitask execution system is configured to be capable of providing protection for important information of each task even in a computing environment in which a memory resource is limited.

Figure 1A:
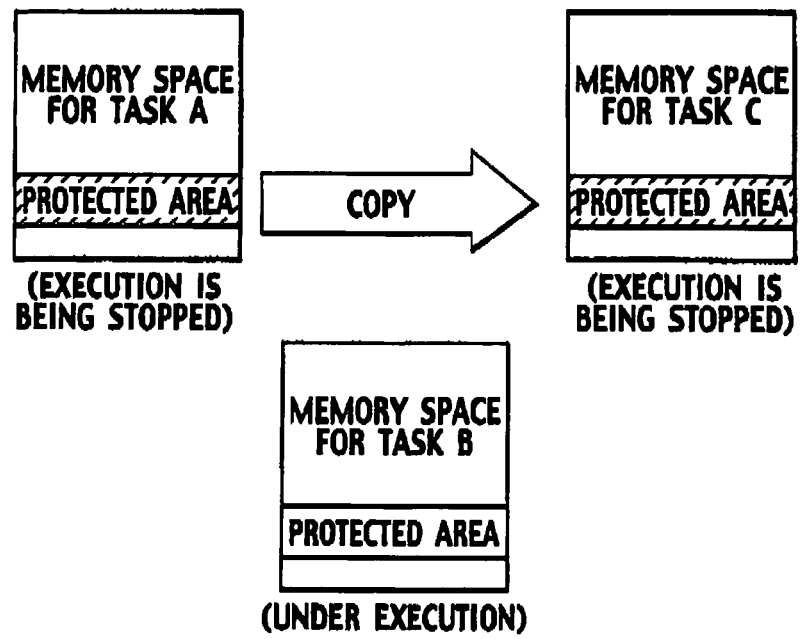
FIGS. 1A and 1B are views for explaining a problem of a multitask execution system according to a conventional technology.
Figure 1B:
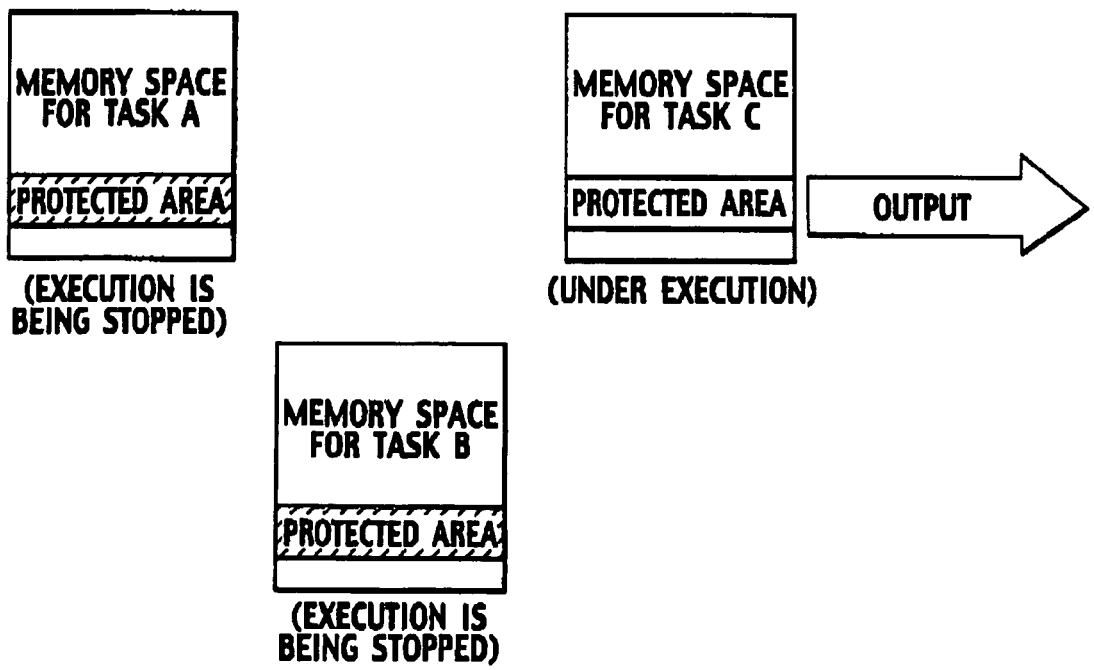
Figure 2:
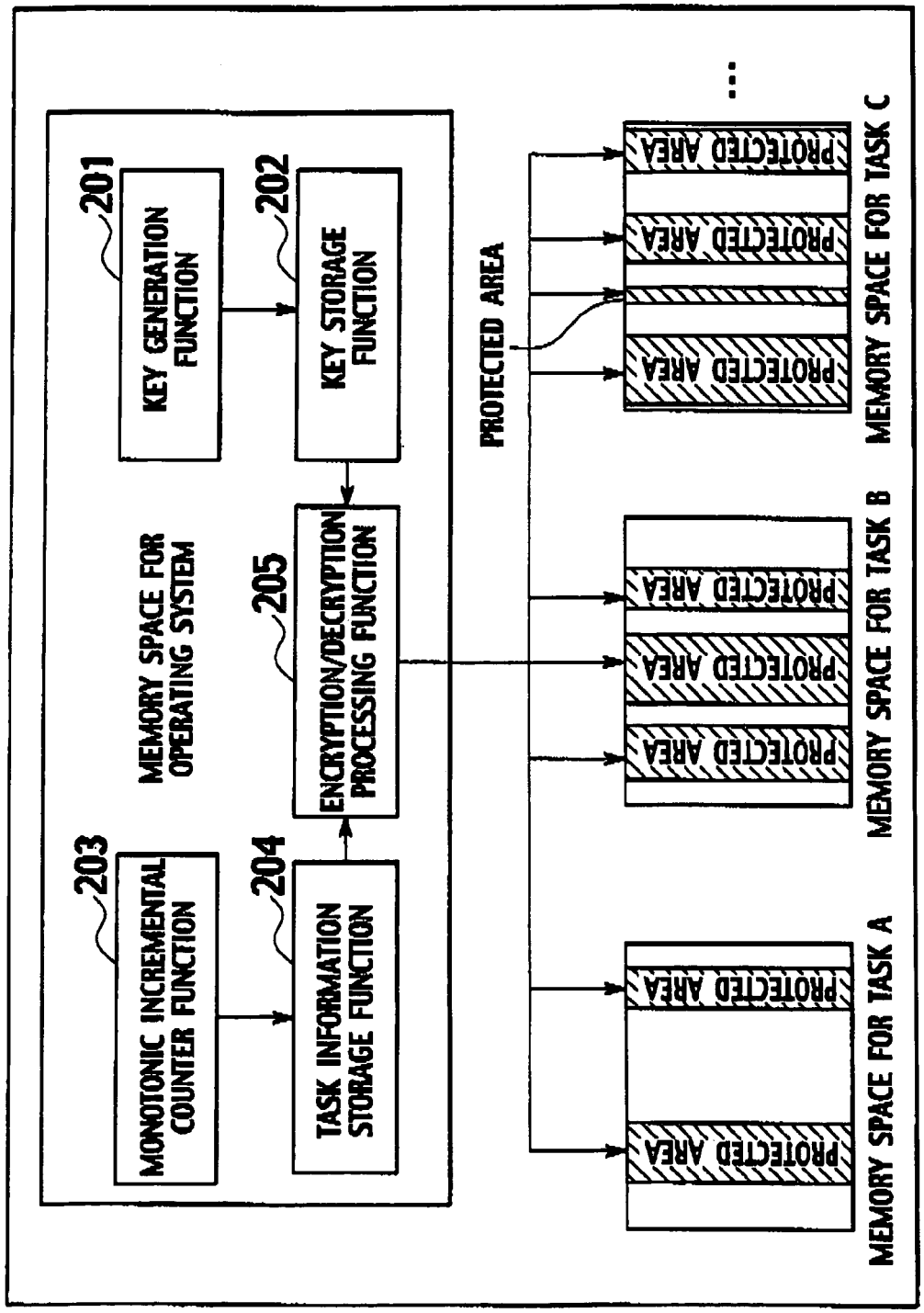
FIG. 2 is a functional block diagram of a multitask execution system according to a first embodiment of the present invention.

FIG. 2 shows a state where the multitask execution system according to this embodiment is loaded in a memory space for the operating system.

As shown in FIG. 2, the multitask execution system according to this embodiment includes a key generation function 201, a key storage function 202, a monotonic incremental counter function 203, a task information storage function 204, and an encryption/decryption processing function 205.

The key generation function 201 is configured to generate single key data for encrypting data (important information) stored in the protected area of each task.

For example, the key generation function 201 is configured to generate key data unpredictable by an attacker by using a safe pseudo random number generation function such as a hardware-like random number generator. Although differing depending on an algorithm for use, a size of the key data is approximately 128 to 256 bits in general.

Moreover, the key generation function 201 is configured to update the above-described key data at predetermined (for example, at a time of system activation, after an elapse of a predetermined period from the generation of the key data, and the like).

The key storage function 202 is configured to hold the single key data generated by the key generation function 201 and to manage a used status of the single key data.

The monotonic incremental counter function 203 is a counter set so that a value of the counter can continue to be increased without being decreased.

Moreover, a configuration may be adopted so that an output value from the monotonic incremental counter function 203 can be a time value provided by the operating system.

In such a case, it is necessary that a configuration be made so that an operation of returning the time value to the past can be prohibited in a time adjustment function of the operating system.

Hence, when it is necessary to make the time adjustment in a direction of returning the time value to the past in the time adjustment function of the operating system, it is necessary to adopt such a system of making the time adjustment asymptotically not by directly changing the time value but by adjusting a time interval.

Moreover, the monotonic incremental counter function 203 is not limited to the counter implemented in the operating system, and may be configured to be provided as hardware.

Note that an increase interval of a monotonic incremental counter value in the monotonic incremental counter 203 is maintained so as to satisfy a condition where an attack by the attacker does not succeed as will be described later.

The task information storage function 204 is configured to record a task ID for identifying each task and the output value (monotonic incremental counter value) from the monotonic incremental counter function 203 at a time when each task is generated in association with each other.

The encryption/decryption processing function 205 is configured to generate a key stream unique to each task by using key data the number of which is smaller than the number of a plurality of tasks operating simultaneously, the task ID, and the monotonic incremental counter value at the time when each task is generated at appropriate timing, and to encrypt the data stored in the protected area in the memory space for each task by using the generated key stream.

In this embodiment, the encryption/decryption processing function 205 uses, as an encryption mode, a CTR (Counter) mode of a block cipher, which is disclosed in the above-described Non-Patent document 1 and the like, in order to realize the property that important information encrypted and stored in the protected area in one memory space for the task is not decrypted correctly, even if the important information is copied to the protected area in the other memory space for the task and the key data for use in the encryption processing in both protected areas is the same.

The CTR mode is one of operation modes of the block cipher, which have been proposed recently. The CTR mode will be briefly described with reference to FIG. 3.

Figure 3:
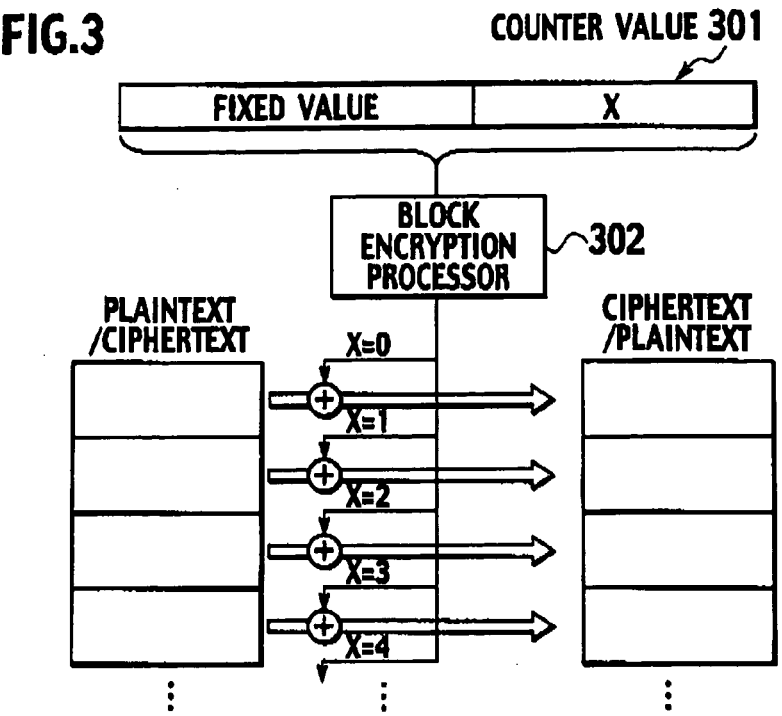
FIG. 3 is a view for explaining a concept of a CTR mode as one of block encryption algorithms.

As shown in FIG. 3, first, in the CTR mode, a counter value 301 maintained so as not to take the same value at all is inputted to an encryption processor 302 corresponding to an encryption algorithm for use.

Second, an exclusive-OR between each bit of each counter value (key stream) encrypted by the encryption processor 302 and each bit of each block constituting plaintext data is calculated, and encryption of the plaintext data concerned is thus performed.

Note that, in the CTR mode, an exclusive-OR between each bit of the key stream and each bit of each block constituting ciphertext data is calculated, thus making it possible to decrypt the ciphertext data concerned.

In the example of FIG. 3, a higher-order portion of the counter value 301 is set as a fixed value, and a lower-order portion of the counter value 301 is set as a variable value X. Note that the variable value X is such a value sequentially increasing from zero one by one correspondingly to each block.

Here, any variable value ray be used for the lower-order portion of the counter value 301 as long as it is ensured that the value concerned is not duplicated for each corresponding block.

Note that, if the encryption algorithm for use is sufficiently safe, and the key stream formed by encrypting the counter value 301 can be regarded as random, then results of the encryption by the CTR mode become completely different from each other even in the case of using the same key data, unless initial values of the counter values completely coincide with each other.

Figure 4:
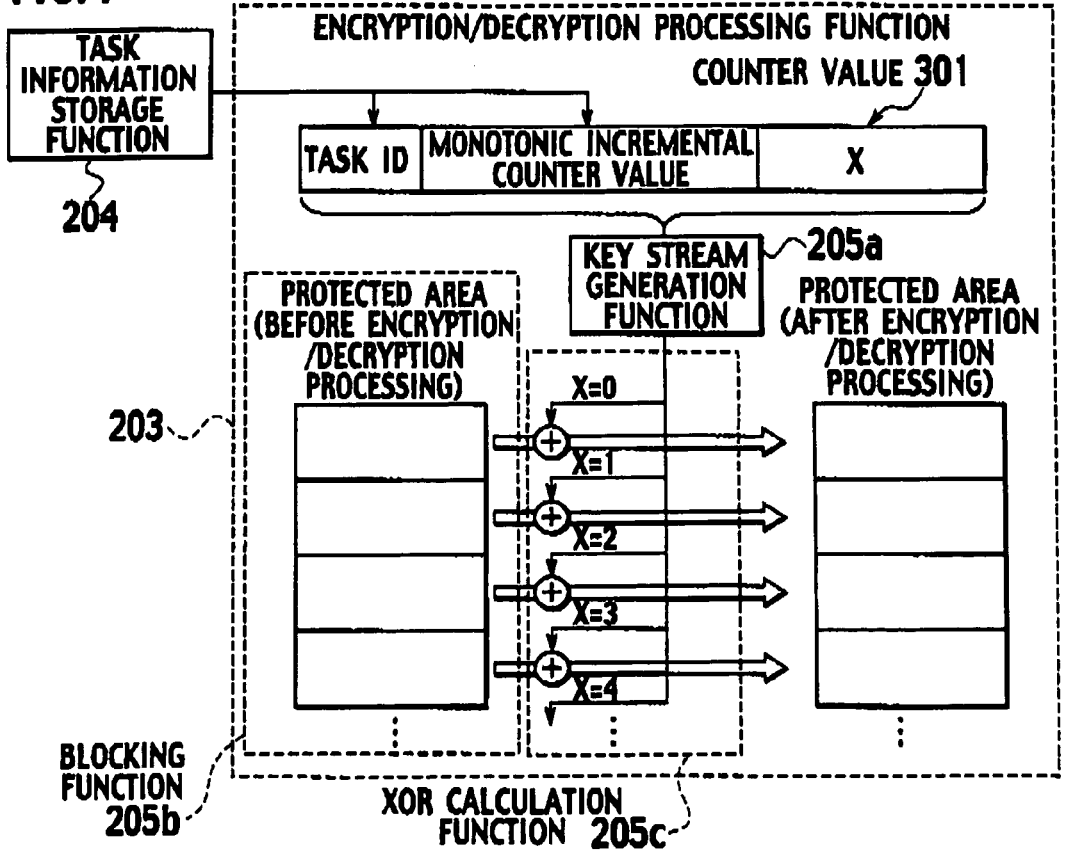
FIG. 4 is a view for explaining a function of encryption/decryption processing of the multitask execution system according to the first embodiment of the present invention.

A configuration of the encryption/decryption processing function 205 using such a CTR mode is shown in FIG. 4. As shown in FIG. 4, the encryption/decryption processing function 205 includes a key stream function 205a, a blocking function 205b, and an XOR calculation function 205c.

The key stream generation function 205a is configured to generate the key stream by encrypting the counter value 301 including the task ID and the monotonic incremental counter value at the time when the task is generated by means of a predetermined encryption mode using the key data.

Specifically, the key stream generation function 205a uses the task ID and the monotonic incremental counter value at the time when the task concerned is generated as the fixed value in the counter value 301 in the above-described CTR mode.

If the fixed value used here can be served to be a value different from those in all the tasks having a possibility to be generated in the system, even if the important information encrypted and stored in the protected area in a specific memory space for the task is copied to the protected area in the other memory space for the task, it can be made impossible for the other task to decrypt the important information concerned correctly.

A condition where the fixed value can be served as described above is that, with regard to the plurality of tasks, both of the task ID and the monotonic incremental counter value at the time when the task concerned is generated do not coincide with each other.

In general, the task ID uses a value of a fixed size. Accordingly, a specific task ID has property to be reused for different tasks while a large number of tasks are being repeatedly generated and vanished, Hence, it is understood that, in order to satisfy the above-described condition, it is satisfactory if the same task ID is not used twice or more while the monotonic incremental counter value is representing the same value.

For example, in the case of assuming a "task ID of 15-bit integer (32768 at the maximum)" and a "monotonic incremental counter value as a time value updated every 10 milliseconds", which are common configurations as a UNIX (registered trademark)-like operating system, in order that the attacker forces the system to allocate the fixed value in the counter value of the same CTR mode to the plurality of tasks, it is necessary to generate or vanish approximately 30,000 tasks during 10 milliseconds while the monotonic incremental counter value is maintaining the same value.

This means that the attack by the attacker does not succeed unless such a condition is satisfied.

In general, an intervention of the operating system is required for the creation and termination of the task, and accordingly, it is substantially impossible to execute a sufficient number of task creation and termination processing at such a high speed as described above under a common hardware environment at present.

The blocking function 205b is configured to divide the data (plaintext data or encrypted text data) stored in the protected area into predetermined blocks.

The XOR calculation function 205c is configured to calculate an exclusive-OR (XOR between a bit string of the generated key stream and a bit string of a predetermined divided block, and to store the calculated exclusive-OR in the protected area.

Moreover, the encryption/decryption processing function 205 is configured to decrypt the data stored in the protected area in the memory space for all the tasks at predetermined timing (for example, when the key data is updated) by using the above-described key stream.

In such a case, the encryption/decryption processing function 205 is configured to encrypt again the data stored in the protected area, which has been decrypted as described above, by using the key stream generated by using the updated key data.

Next, an operation of the multitask execution system according to this embodiment will be described with reference to FIG. 5 and FIG. 6.

First, description will be made of an operation of encrypting the data stored in the protected area in the memory space for each task in the multitask execution system according to this embodiment with reference to FIG. 5.

Figure 5:
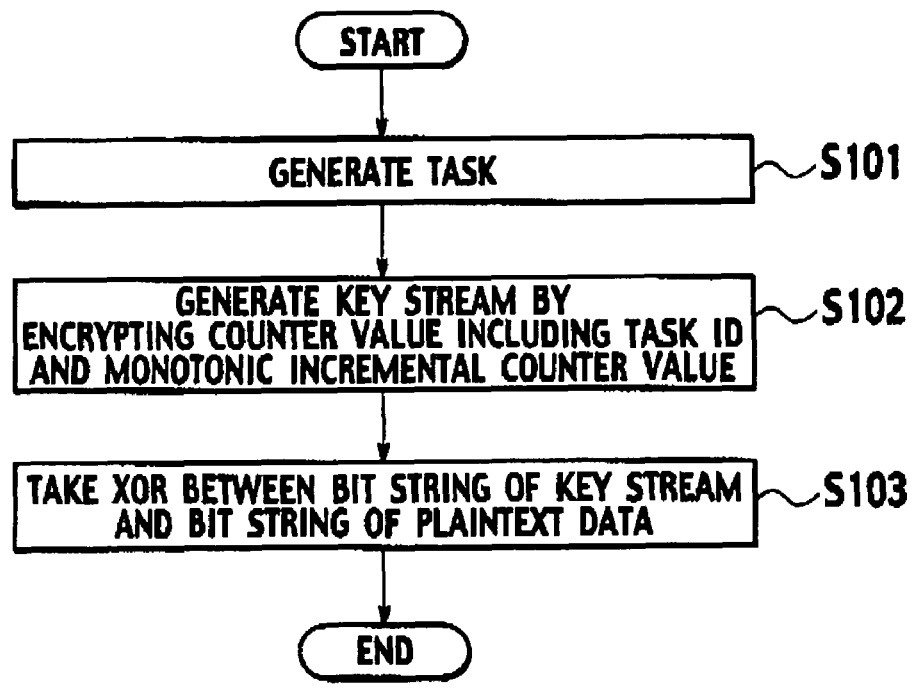
FIG. 5 is a flowchart for explaining an operation of encrypting data stored in a protected area in the multitask execution system according to the first embodiment of the present invention.
Figure 6:
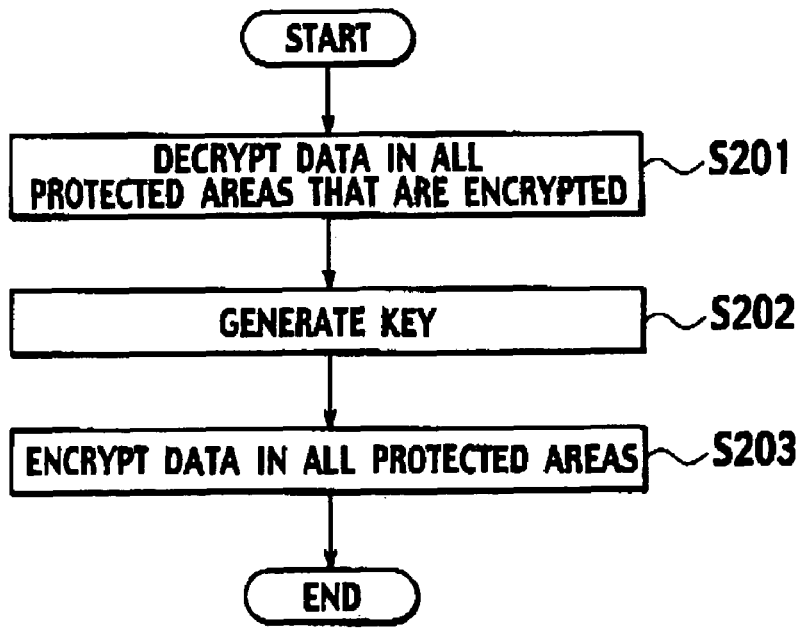
FIG. 6 is a flowchart for explaining an operation of updating key data in the multitask execution system according to the first embodiment of the present invention.

As shown in FIG. 5, in Step S101, the operating system generates a new task, and allocates, to the task concerned, the memory space for the task. Here, the task information storage function 204 stores information concerning the protected area in the memory space for the task concerned, the task ID, and the output value (monotonic incremental counter value) from the monotonic incremental counter function 203 at the time when the task concerned is generated.

In Step S102, the key stream generation function 205a of the encryption/decryption processing function 205 generates the counter value 301 composed of the task ID stored in the task information storage function 204, the monotonic incremental counter value and the variable value X at the time when the task concerned is generated.

Then, the key stream generation function 205a encrypts the counter value 301 by means of a predetermined encryption mode by using the key data stored in the key storage function 202, thereby generating the key stream.

Here, the key stream generation function 205a sequentially increases the variable value X from 0 one by one, thereby generating the key stream with a length corresponding to the number of predetermined blocks formed by dividing the data (plaintext data) stored in the above-described storage area.

In Step S103, the XOR calculation function 205c calculates the exclusive-OR between the bit string of the key stream and the bit string of the plaintext data, and stores the calculated exclusive-OR as the encrypted data in the protected area.

Second, description will be made of an operation of updating the key data in the multitask execution system according to this embodiment with reference to FIG. 6.

In general, in such a service environment where the system is restarted in a relatively short period (approximately within a day), security thereof is not damaged even if the single key continues to be used without being updated.

In such a case, the key storage function 202 just has to have a function to store the key data generated by the key generation function 201 at the point of time when the system is activated or the key data is required for the first time.

However in such a service environment where a continuous operation is performed for a long period of time such as in the server computer, the continuous use of the single key without being updated has a possibility to bring a significant degradation of the security. Accordingly it becomes necessary to perform the update processing for the key data for use at appropriate timing.

Hence, in Step S201, the encryption/decryption processing function 205 decrypts, at appropriate timing, the data in all the protected areas, which are being encrypted, by using the key stream generated by using the key data being used at present.

In Step S202, the key generation function 201 updates the key data for use, and the key storage function 202 stores the updated key data.

In Step S203, the encryption/decryption processing function 205 encrypts the data in all the protected areas by using the key stream generated by using the updated key data.

In accordance with the multitask execution system according to this embodiment, the key stream unique to each task can be generated by using the single key data. Accordingly, even if the important information of a specific task is copied to the other task, such important information is not decrypted correctly on the task of the copy destination, thus making it possible to protect the important information of each task efficiently by means of a small memory resource.

Specifically, in accordance with the multitask execution system according to the present invention, the data that must be placed in the memory space for the operating system can be made minimum such as the single key data. Accordingly, even in the platform such as the PDA and the cellular phone in which the memory resource is limited, a multitask environment capable of protecting the important information of each task can be realized.

Figure 9:
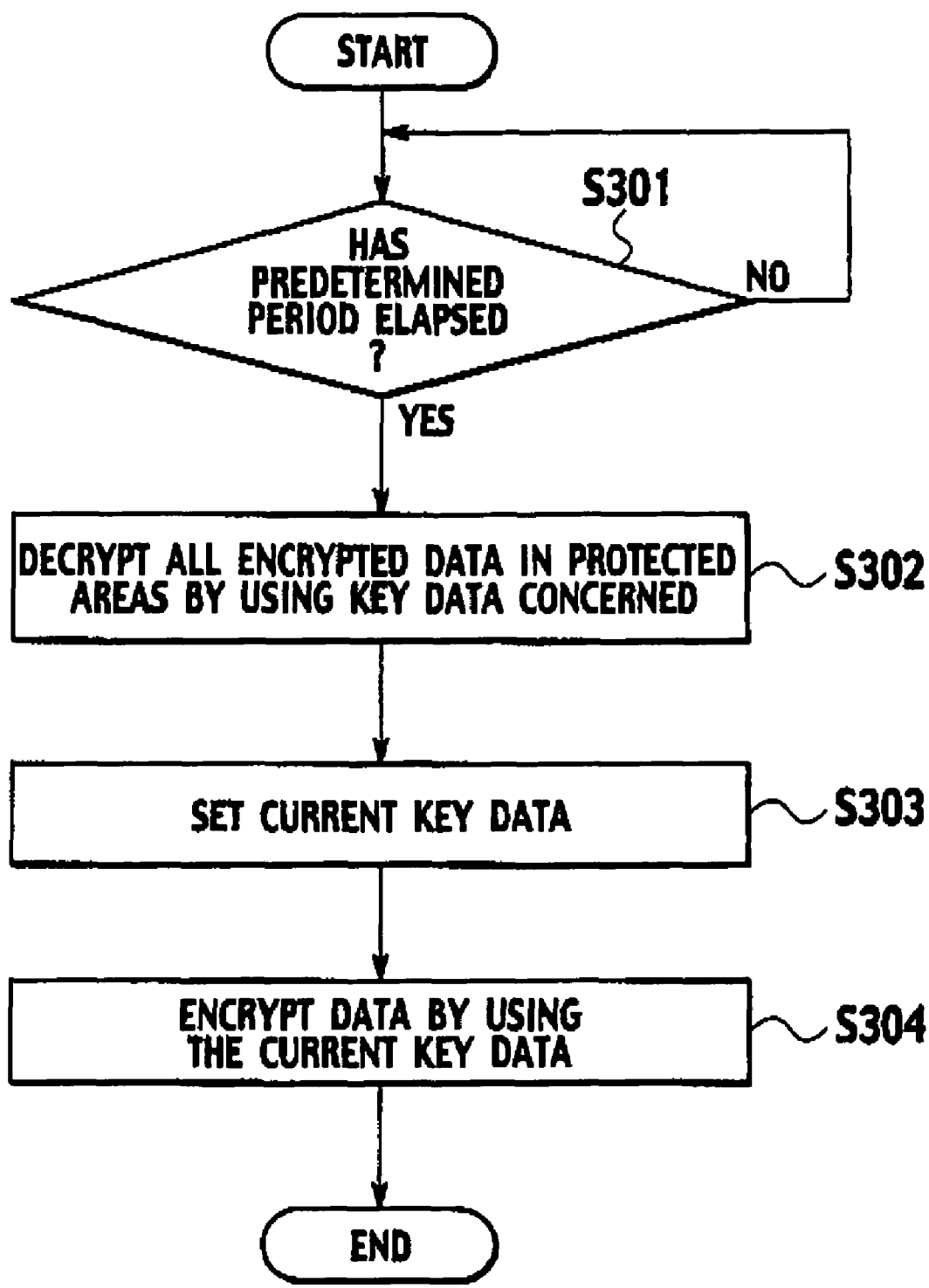
FIG. 9 is a flowchart for explaining an operation of updating key data in the multitask execution system according to the second embodiment of the present invention.

Multitask Execution System According to Second Embodiment of the Present Invention A multitask execution system according to a second embodiment of the present invention will be described with reference to FIG. 7 to FIG. 9. Description will be made of the multitask execution system according to this embodiment mainly focusing on different points thereof from the multitask execution system according to the above-described first embodiment.

In general, when each task has a large number of the important information, there is a possibility that a part of such important information is saved in the secondary storage device such as the hard disk.

Hence, it is an object of the multitask execution system according to this embodiment to enable the efficient update of the key to be realized even in such a case.

In this embodiment, as shown in FIG. 7, the key storage function 202 stores a plurality of key data. Specifically, with regard to each key data, the key storage function 202 stores a key number for identifying the key data concerned, the key data concerned, a generation date of the key data concerned, a current flag and the number of references in association with one another.

Here, the current flag is a flag indicating whether or not the key data concerned is the key data currently in use. Only one of plural key data is set so as to be the current key data to be used for performing new encryption processing. Other key data have either attribute of "unused" or "existence of data encrypted by using the key data concerned in the past".

Moreover, the number of references indicates, for the current key data and the key data with the attribute of "existence of data encrypted by using the key data concerned in the past", as to how many protected areas are encrypted by using the key data concerned.

Here, the key data with the attribute of ""existence of data encrypted by using the key data concerned in the past" turns to an unused state when the number of references becomes 0 as a result of decrypting the important information stored in the protected area by the key data concerned.

Moreover, the current key data becomes invalid at a point of time when a predetermined time (for example, 1 hour) elapsed from the generation thereof. Then, at the next time when the encryption processing for the important information becomes necessary, the key storage function 202 sets, as the current key data, new key data generated by the key generation function 201.

Moreover, in this embodiment, as shown in FIG. 8, the task information storage function 204 stores, with regard to each protected area, a protected area number for identifying the protected area concerned, a starting address in an address space for each task in the protected area concerned, a size of the protected area concerned, state information indicating whether the data (important information) stored in the protected area concerned is a ciphertext or a plaintext, and a used key data number for identifying the key data for use in the encryption processing for the data (important information) in the protected area concerned in association with one another.

Here, description will be made of an operation of updating the key data in the multitask execution system according to this embodiment with reference to FIG. 9.

In Step S301, the encryption/decryption processing function 205 determines whether or not a valid period of the key used at present has elapsed.

When it is determined that the valid period has elapsed, in Step S302, the encryption/decryption processing function 205 decrypts the data stored in all the encrypted protected areas by using the key stream generated by using the key data in which the valid period has elapsed.

In Step S303, the key storage function 202 sets and stores, as the current key data, the key data for use from the key data generated by the key generation function 201.

In Step S304, the encryption/decryption processing function 205 encrypts the data stored in all the protected areas by using a key stream generated by using another key data (that is, key data set as the current key data) than the key data in which the valid period has elapsed.

In accordance with the multitask execution system according to this embodiment, the plural key data are stored in the key storage function 202, thus making it possible to minimize the processing that becomes necessary when the key data is updated.

MODIFICATION EXAMPLE 1

Modification example 1 of the present invention will be described with reference to FIG. 10.

Figure 10:
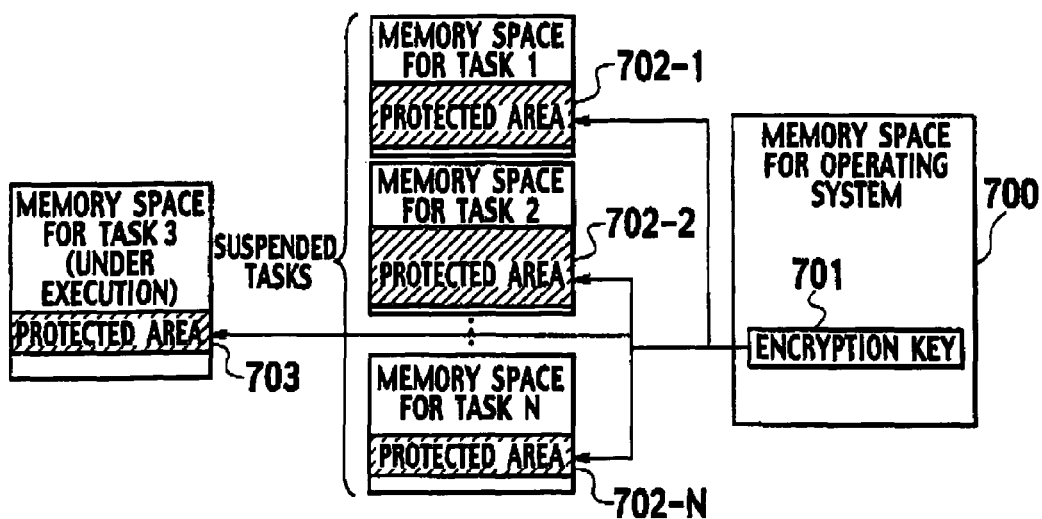
FIG. 10 is a view for explaining a multitask execution system according to Modification example 1 of the present invention.

As shown in FIG. 10, in this modification example, the operating system encrypts important information stored in memory spaces 702-1 to 702-N for tasks, which are suspended by the context switching, by using a single encryption key (key data) 701 placed in a memory space 700 for the operating system.

Meanwhile, in this modification example, the operating system decrypts important information stored in a memory space 703 for a task, of which execution is resumed by the context switching, by using the single encryption key (key data) 701 placed in the memory space 700 for the operating system.

In accordance with the multitask execution system according to this modification example, the CTR mode based on the task ID and the monotonic incremental counter value at the time when the task concerned is generated is used as the encryption node, and thus the protection of the important information of the plural tasks by the encryption using the single encryption key 701 is safely realized.

Note that the multitask execution system according to this modification example is one suitable for a system of such a service mode repeating the stop and activation thereof relatively frequently.

MODIFICATION EXAMPLE 2

Modification example 2 of the present invention will be described with reference to FIG. 11. In this embodiment, unlike the case of the above-described Modification example 1, not the single encryption key but the encryption keys of which number is smaller than the number of all the tasks are used.

Figure 11:
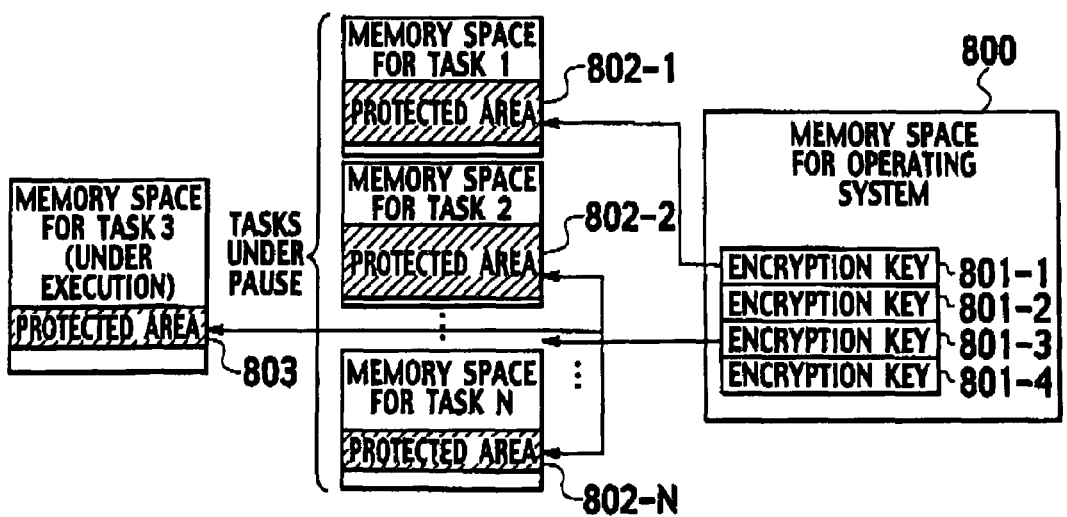
FIG. 11 is a view for explaining a multitask execution system according to Modification example 2 of the present invention.

As shown in FIG. 11, in this modification example, the operating system encrypts important information stored in memory spaces 802-2 to 802-N for the respective tasks, which are suspended by the context switching, by using a current encryption key (current key data) 801-3 among plural encryption keys placed in a memory space 800 for the operating system.

Here, a task 802-1 under suspended status has execution thereof intermitted in a state of being still encrypted before the current encryption key becomes valid. Accordingly, when the execution of the task 802-1 is resumed, data stored in a memory space for the task 802-1 concerned must be decrypted by using a past encryption key 801-1.

It is possible for the multitask execution system according to this modification example to realize the update processing of the encryption key at relatively low cost. Accordingly, the multitask execution system is also applicable to such a service environment situated in an activation state for a long period.

As described above, according to the present invention, in the modern operating system providing the multitask environment, the multitask execution system capable of protecting the important information of each task efficiently by means of the small memory resource can be provided.

Additional advantages and modifications will readily occur to those skilled in the art. Therefore, the invention in its broader aspects is not limited to the specific details and the representative embodiments shown and described herein.

Accordingly, various modifications may be made without departing from the scope of the general inventive concept as defined by the appended claims and their equivalents.

What is claimed is:

1. A multitask execution apparatus for executing a plurality of tasks in parallel, comprising:
an encryption processor configured to generate a key stream unique to each task, by using key data, a task ID for identifying each task, and an output value, the number of the key data being smaller than the number of the plurality of tasks, the output value being output from a monotonic incremental counter when each task is generated, a value of the monotonic incremental counter configured to continue to be increased without being decreased, and to encrypt data stored in a protected area in a memory space for each task by using the generated key stream, the encryption processor comprising:
a key stream generating function configured to generate the key stream by encrypting a counter value including the task ID and the output value by means of a predetermined encryption mode using the key data;
a blocking function configured to divide the data stored in the protected area into predetermined blocks; and
an exclusive-OR calculation function configured to calculate an exclusive-OR between a bit string of the generated key stream and a bit string of a predetermined divided block, and to store the calculated exclusive-OR in the protected area.

2. The multitask execution apparatus according to claim 1, further comprising:
a decryption processor configured to decrypt the data stored in the protected area by using the key stream,
wherein the encryption processor is configured to encrypt data stored in the protected area decrypted by the decryption processor by using the key stream generated by using updated key data.

3. The multitask execution apparatus according to claim 2, wherein
the decryption processor is configured to decrypt the data stored in the protected area by using a key stream generated by using the key data in which a valid period has elapsed, and
the encryption processor is configured to encrypt the data decrypted by the decryption processor and stored in the protected area by using the key stream generated by using another key data than the key data in which the valid period has elapsed.

4. The multitask execution apparatus according to claim 1, wherein
the output value outputted from the monotonic incremental counter is a time value provided by an operating system, and
an operation of returning the time value to the past is configured to be prohibited in the operating system.

5. The multitask execution system apparatus according to claim 1, wherein the monotonic incremental counter is provided as hardware.

6. A multitask execution method implemented on a multitask execution apparatus for executing a plurality of tasks in parallel, comprising:
generating a key stream unique to each task, by using key data, a task ID for identifying each task, and an output value, the number of the key data being smaller than the number of the plurality of tasks, and generating the key stream by encrypting a counter value including the task ID and the output value by means of a predetermined encryption mode using the key data;
outputting a monotonic incremental counter value when each task is generated, a value of the monotonic incremental counter configured to continue to be increased without being decreased;
encrypting data stored in a protected area of a memory space for each task by using the generated key stream;
dividing the data stored in the protected area into predetermined blocks; and
calculating an exclusive-OR between a bit string of the generated key stream and a bit string of a predetermined divided block, and storing the calculated exclusive-OR in the protected area.

7. The multitask execution method according to claim 6, further comprising:
decrypting the data stored in the protected area by using the key stream; and
encrypting data stored in the protected area decrypted by the decrypting by using the key stream generated by using updated key data.

8. The multitask execution method according to claim 7, wherein
the decrypting includes decrypting the data stored in the protected area by using a key stream generated by using the key data in which a valid period has elapsed, and
the encrypting the data decrypted by the decrypting and stored in the protected area is performed by using the key stream generated by using another key data than the key data in which the valid period has elapsed.

9. The multitask execution method according to claim 6, wherein
the monotonic incremental counter value is a time value provided by an operating system, and
an operation of returning the time value to the past is configured to be prohibited in the operating system.

10. The multitask execution method according to claim 6, wherein the monotonic incremental counter is provided as hardware.

* * * * *